United States Patent
Maheshwari

(10) Patent No.: US 12,143,556 B2
(45) Date of Patent: Nov. 12, 2024

(54) PRINTER CALIBRATION USING ERROR-CORRECTED COLOR PROFILE GENERATION

(71) Applicant: M/S Kothari Infotech Pvt. Limited, Gujarat (IN)

(72) Inventor: Sanjay Chandramohan Maheshwari, Surat (IN)

(73) Assignee: M/S Kothari Infotech Pvt. Limited, Gujarat (IN)

( * ) Notice: Subject to any disclaimer, the term of this patent is extended or adjusted under 35 U.S.C. 154(b) by 0 days.

(21) Appl. No.: 18/154,123

(22) Filed: Jan. 13, 2023

(65) Prior Publication Data
US 2023/0231964 A1 Jul. 20, 2023

Related U.S. Application Data

(62) Division of application No. 16/618,356, filed as application No. PCT/IN2017/050213 on May 31, 2017, now abandoned.

(51) Int. Cl.
*H04N 1/60* (2006.01)
*H04N 1/00* (2006.01)

(52) U.S. Cl.
CPC ....... *H04N 1/6038* (2013.01); *H04N 1/00023* (2013.01); *H04N 1/00034* (2013.01); *H04N 1/6019* (2013.01); *H04N 1/6058* (2013.01)

(58) Field of Classification Search
CPC .............................................. H04N 1/60–6097
See application file for complete search history.

(56) References Cited

U.S. PATENT DOCUMENTS

| | | | |
|---|---|---|---|
| 6,654,143 B1 | 11/2003 | Dalal et al. | |
| 10,161,794 B2 * | 12/2018 | Gurevich | G01J 3/027 |
| 2005/0083346 A1 | 4/2005 | Takahashi et al. | |
| 2005/0083540 A1 * | 4/2005 | Hersch | H04N 1/6025 358/1.9 |
| 2008/0259400 A1 * | 10/2008 | Hersch | B41M 3/144 358/2.1 |
| 2009/0190180 A1 * | 7/2009 | Verbeeck | H04N 1/6016 358/3.23 |
| 2010/0053653 A1 * | 3/2010 | Hatori | H04N 1/6033 358/1.9 |
| 2011/0199626 A1 | 8/2011 | Bestmann | |

* cited by examiner

*Primary Examiner* — Barbara D Reinier
(74) *Attorney, Agent, or Firm* — Fish & Richardson P.C.

(57) ABSTRACT

The present invention relates to a method of generating "expanded color chart" representing various ink combination, for profiling a multi-color printing device or printer, using "reduced set of color chart", printed using the printer, where
a. The expanded color chart is computed by applying "Error Correction" function to the expanded color chart predicted using a theoretical model of color prediction for a given ink combinations in the expanded chart.
b. Error Correction function is computed/modelled as function of the variance/difference observed between the color values predicted by the theoretical model and the actual values measured for the ink combinations in the printed "reduced set of color chart".

20 Claims, 2 Drawing Sheets

Figure 1 – Process of creating the color profile from reduced set of patches/ ink combination chart.
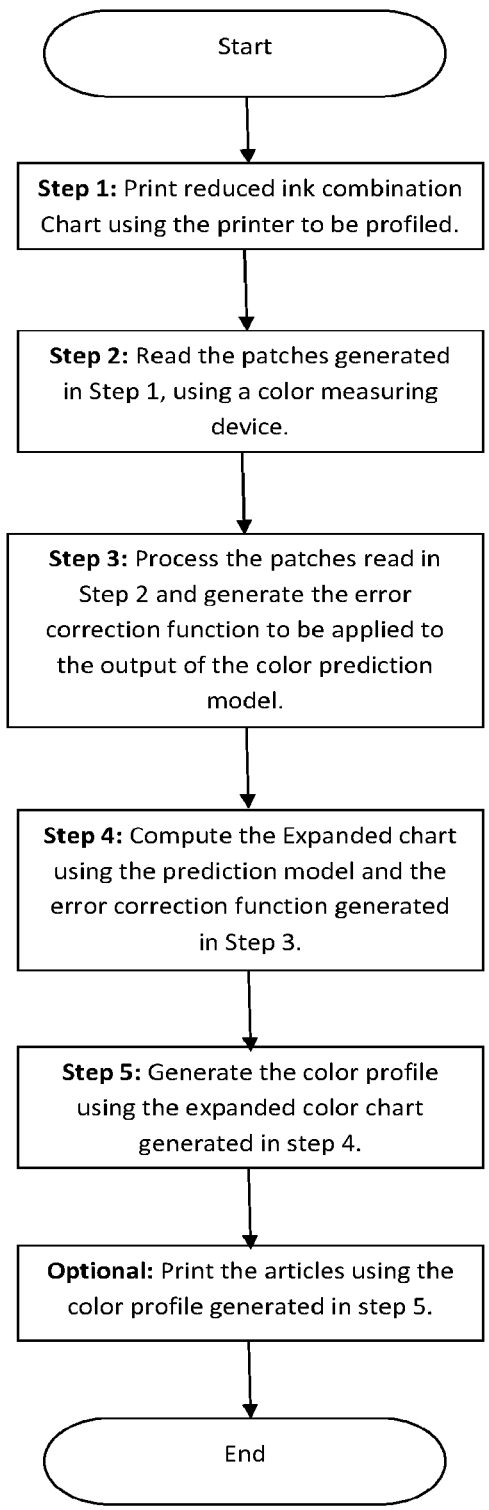

Figure 2 – Apparatus involved in creating the color profile from reduced set of patches/ ink combination chart using the process outlined in Figure 1.
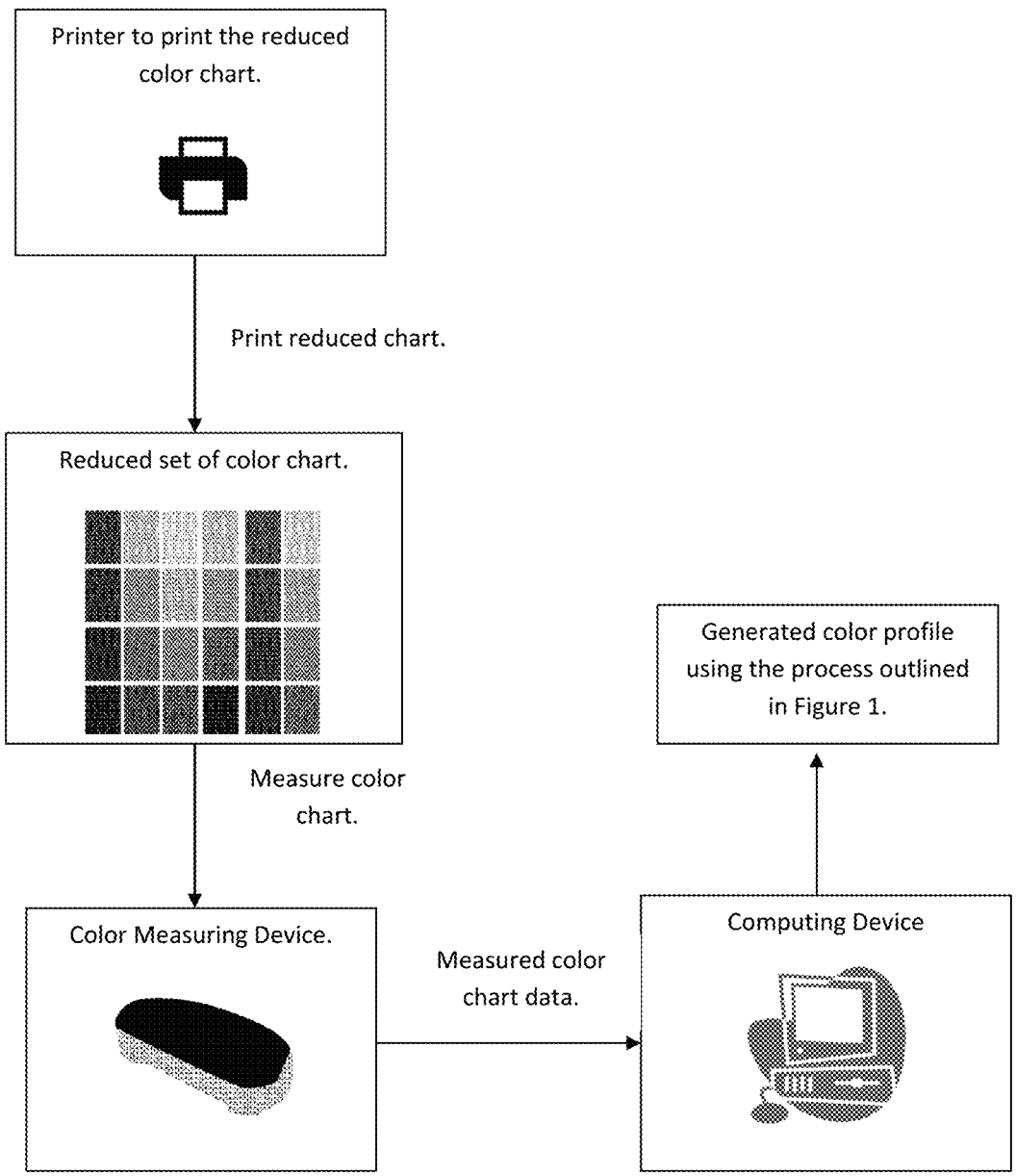

PRINTER CALIBRATION USING ERROR-CORRECTED COLOR PROFILE GENERATION

CROSS-REFERENCE TO RELATED APPLICATIONS

This application is a divisional of U.S. application Ser. No. 16/618,356, filed Nov. 30, 2019, which is a National Stage of International Application No. PCT/IN2017/050213, filed May 31, 2017, the contents of which are incorporated herein by reference.

FIELD OF THE INVENTION

The present invention relates to a method and an apparatus for generating accurate color profiles with reduced number of patches.

BACKGROUND OF THE INVENTION

With the technological developments happening in the field of printing whether it is chemistry or machinery, there are new expectations. These new expectations present new challenges. Color printing devices are increasingly using multi color inks in order to increase the color gamut for printing. There is an increasing demand to produce accurate color on these devices while exploiting the full potential of the color gamut offered by these devices. Producing accurate color needs color calibrated workflows, starting from Image creation to Image printing.

Printing an image in a color calibrated workflow requires calibration and characterization of the printing device, in addition to the devices involved in display and capturing of images. These printing devices can be of various types ranging from conventional printing devices for example, silk screen printing, offset and gravure printing to digital printing devices operating under direct control of a computer or a digital controller, such as led/laser printer, digital offset, inkjet printer. These printers use various color inks for printing the images, and the various color inks together form an inkset used for printing the images on a substrate. The inks are optimized for printing on the particular substrate. Typically the ink colors used are cyan, magenta, yellow and black. In addition, other color inks like red, orange, blue, green, violet, fluorescent colors etc. are also used in order to expand the gamut of printing colors.

Calibration of a printing device involves calibrating the response of the inkset when applied by the printing device on a substrate. This generally requires printing graded ink amount (percentages) chart of all the inks used in the printing in order to create a gain compensation curve that ensures that corresponding change in ink amount brings equal change in perceived color or ink density. If the inkset used for printing involves light color inks, then there is an additional step of blending the light and the dark inks together and the blended response of said light and dark inks is also calibrated. This completes the printer calibration. Once the printer is calibrated, a characterization target is printed in order to profile the printer. This printed characterization is read using a spectrophotometer in order to create a color table called color profile. This color table defines the relationship between the input color and the ink amount to be used to print it.

In order to produce a high quality color table, the color space spanned by the multi color inks need to be densely sampled. These densely sampled points in the color space form the target for characterizing the printing device. As the number of inks in the inkset increases, the total number of points to be sampled increases geometrically. A typical target would consist of few thousand patches of sampled points to over a million of such patches depending upon the number of inks used in the printer inkset for printing and the sampling frequency. It is not uncommon to find targets with tens of thousands to over hundreds of thousand patches depending upon the number of inks in the inkset for creating profiles with reasonable accuracy. The thumb rule is higher the sampling frequency higher the profile accuracy, which also means that the number of patches in the characterization target increase geometrically.

Reading each of these individual patches with the spectrophotometer by hand is extremely painful task and can take a few days to read a large target. Advancement in spectrophotometer technology has eased this task by reading few patches in a single scan. However the scanning device is still used manually to scan each row of colors by hand. This manual task is further made easier by automated scan tables that read targets page by page using its robotic arm. While the pages are being read by the robotic arm, the pages on the table are still placed by hand one by one. The automated technology reduces the potential errors that can occur while scanning by hand. Automated tools while they reduce the pain of scanning by hand, still takes time over few hours to couple of days to scan the charts depending upon the size of the target. In addition, they still require attention of the operator who places the target page by page on the scanning table.

Further, the automated scan table is not very useful in case of flexible targets for example, fabric as the dimensions are not retained. So the scanning is still done by hand for such substrates as they require adjustment for each row before scanning. This required adjustment makes it even slower to scan the target. Therefore, while the automated spectrophotometer scanning systems have helped, they are not suitable for every substrate. Also, printing large targets on flexible media can be prone to errors depending upon the processes involved in printing. For example in case of fabric the large target is prone to stamping during the process of printing or color fixation. All these factors reduce the accuracy of the resulting profile.

While the technology has reduced the overall man-hour involved in the scanning process of the test targets for profiling, it is still required to have large charts in order to generate color tables of high accuracy. This is the primary motivation for us to seek the reduction in number of patches in the characterization target in order to speed up the process of color profiling without compromising the accuracy of the profile.

There are few models proposed in the literature to achieve this goal. P Soler, J Morovic and H Doumaux [3] proposed a spectral data driven interpolation and extrapolation model built from the measured set or training set to compute the resulting spectral reflectance data of a given ink combination. The key is to choose the mathematical function for interpolation/extrapolation. Since the assumption by this model is that the resulting color spectra corresponds to approximately a multiplicative relationship of individual primary color reflectance and the bounds of the mapping function fn: $[0,1] \times [0,1] \to [0,1]$, this model will not work with fluorescent colors where the normalized reflectance of fluorescence region is greater than 1. Deshpande et al [1] describes a method to predict the overprint of the spot colors. This method was also later also recommended by ICC [2]. However, the goal of this method is to simulate and not accurately predict the appearance of overprints of two or more spot colors. Besides, this method requires printing of color wedges on black and white colored substrates. This may not be always possible in practice to do so. It can be argued that a database can be created for substrate and ink combination but it is again not practical when the number of substrates that can be printed can have countless varieties like fabric.

There are theoretical models in the literature to predict the color of ink/colorant mixtures. These models have been used successfully over the years to predict the colors of mixtures for coloration of textiles, paper, plastic etc. The most successful of these theoretical models is Kubelka-Munk theory based two constant and single constant models [4][5].

Several proposals have been made to add empirical terms to existing theoretical model based on the measured data in order to improve its prediction accuracy. However, these extensions are at best good only for the situations they are modelled upon. None of the theoretical model or their extensions is accurate enough in their overprint estimation for use as generic model in printing.

Thus, the prior art largely use measured data to compute empirical parameters of the models used for prediction of the overprints. A method is hereby presented that uses the measured ink combination data/training set to compute the errors that can be universally applied to correct the output of a prediction model.

BRIEF DESCRIPTION OF THE DRAWINGS

FIG. 1 is a flow chart of a process for generating a color profile.

FIG. 2 is a diagram showing an apparatus for generating a color profile.

OBJECTS OF THE INVENTION

It is therefore an object of the invention to propose a method that uses the measured ink combination data/training set to compute the errors that can be universally applied to correct the output of a prediction model.

Another object of the invention is to propose an apparatus for generating accurate color profiles with reduced number of the patches.

BRIEF SUMMARY OF THE INVENTION

Accordingly, there is provided a method that uses the measured ink combination data/training set to compute the errors that can be universally applied to correct the output of a prediction model.

The disclosed method to predict the color for a combination of inks is based on the following equation—

$$\text{Actual\_Color\_Predicted} = f\_\text{ErrorCorrection}(f\_\text{Match-Prediction}(\text{ink combination}), \text{ink combination}); \quad \text{eqn}(1)$$

As evident from equation (1), our method is essentially based on introducing correction to output from a color Prediction model. This "Prediction Model" can be any model that is suitable for the printing substrate and ink interaction. It can be theoretical or empirical. The examples of such theoretical models are single constant Kubelka-Munk theory, two constant Kubelka-Munk theory, Yule-Neilson method etc [4][5]. The prediction function takes the color values of the ink primaries at various concentration or printing percentage levels as input. For high accuracy it is desired that this ink primary data is properly linearized. The color values of the ink primaries can be either spectral reflectance data or device independent color space values like XYZ or Lab. If the prediction model requires the input to be in spectral form, then the device independent color space values of the primaries data can be converted to spectral input by generating synthetic spectral reflectance values.

The method requires a small target of known ink combination sampled at various intervals of the color solid spanned by the inks to be read. Using the Prediction model, the predicted color values are computed for these various known ink combinations. An Error function is then initialized that takes into account the differences between the measured values and predicted values. This Error function is based on the "Error solid" that has a correction value for each of the known ink combination printed from the sampled ink color solid. The Error function can now use this "Error Solid" to compute the correction factors for given/unknown ink combinations. These correction factors can be applied to the prediction result from the "Prediction Model" for these unknown ink combinations in order to get the corrected overprint color value.

The correction factor is computed from the ErrorSolid using a function that is based on the known errors in the nodes. The metrics used for error can vary based on the Prediction model being implemented. For example the error correction can be in Spectral domain or in CIE LAB color space or combination of both etc. The error correction factor computation for unknown ink combinations can be computed based on the various interpolation methods in multi-dimension. One of the possible methods is to generate the error correction factor as weighted sum of the ink combination location in the color solid. For example if the color solid is tetrahedral then the error can be weighted sum of the 4 corners of tetrahedra defined by the barycentric coordinates of the ink combination.

Lets look at how our proposed method can be implemented in practice.

Example 1—Prediction Model Based on Single Constant Kubelka Munk Theory

Single constant Kubelka Munk theory (KM1) describes the coloration of textiles (dyeing) quite well, but isn't accurate enough to model the printing of textiles. This deficiency can be overcome by using our method.

Based on equation 1, we propose the correcting function to add the error correction to the prediction from "KM1 model" as below—

$$\text{Actual\_Color\_Predicted} = \text{KM1\_Predicted}(Ci) + f\_\text{Error}(Ci) \quad \text{eqn (2)}$$

Where,
- $Ci$ denotes the concentration of various inks in the combination.
- $f\_\text{Error}$ returns the correction factor in CIE Lab color space.
- KM1_Predicted returns the resulting color based on single constant Kubelka Munk theory in CIE Lab space predicted from the "spectral reflectance data" for various inks at their respective concentrations.
- The spectral reflectance data for specific ink at respective concentration is computed from that ink primary color data measured at various known concentrations/percentages using an interpolation function.

The input to "KM1 model" is spectral data. Following is the general implementation of KM1 model for n color ink combination (c1, c2 ... cn) on a substrate S.

$$f(\alpha\lambda) = a_{s,\lambda} + \alpha\lambda,1c1 + \alpha\lambda,2c2 + \ldots + \alpha\lambda,n\ cn \quad \text{eqn 3.}$$

Where, $f(\alpha\lambda)$ is the absorption coefficient of the overprint/mixture, as, $\lambda$ is the absorption coefficient of the substrate, $\alpha\lambda$, 1 c1 is the absorption coefficient of ink 1 at concentration C1, and $\alpha\lambda$, n cn is the absorption coefficient of ink n at concentration Cn.

Absorption coefficient $\alpha\lambda$ is related to the reflectance by following equation:

$$K/S \text{ or } \alpha\lambda = (1-R)^2/2R. \quad \text{Eqn 4}$$

And the reflectance is related to the absorption coefficient according to the following equation:

$$R = 1 + (K/S) - \{(K/S)[(K/S)+2]\}^{1/2} \quad \text{Eqn 5}$$

So using equation (4) the reflectance values can be converted to absorption coefficient and equation (3) can be used to model the resulting absorption coefficients for an ink combination. The resulting absorption coefficient can then be converted back to reflectance using equation (5). The resulting reflectance spectrum can be converted into corresponding CIE Lab value using conversion equations well defined in CIE literature.

So, for each of the known ink combination in the target, KM1_Predicted function can be used to compute the theoretical predicted values. Rearranging the equation (2), the difference between the measured value and this predicted value is the error in CIE Lab space for each of these known combinations that form the nodes of the "ErrorSolid".

Assuming that we are dealing with a CMYK printing ink solid, the input to the KM1 model used by above KM1_Predicted function will be printed color wedges of CMYK inks at various percentages between 0 to 100% (eg, at a spacing of 10%). The test target could be division K=3 of the ink colorspace, totalling 81 patches. The error function can be a linear interpolation function in 4 dimensional CMYK color space interpolating between the values of the known errors from the measured data. From this chart and the prediction model described, highly accurate chart with a division of k=10, can be generated, that can be used as a target for generating color tables.

This discussion for CMYK/4 color solid can be extended to color solids using more than 4 colors in a similar manner.

Example 2—Prediction Model Based on Single Constant Kubelka Munk Theory and Spectral Radiance Factor (SRF) for Predicting Overprints with Fluorescent Colors As can be seen from equation 4, the absorption coefficient are valid for reflectance values less than or equal to value of 1, above which the Kubelka Munk equation fails as we are dealing with fluorescence and not absorption. The key to handle this situation is to separate the reflectance curve (R_Total) into (i) Normal reflectance values ("Normal(R)") equivalent to the reflectance (R) from equation 4 and (ii) SRF values that represent fluorescence and can be handled separately. Equation (6) describes this.

$$R\_Total = Normal(R) + SRF \quad \text{eqn (6)}$$

In order to determine SRF, a special measuring instrument is required that measures the color sample with and without fluorescence in order to separate the SRF. Such instruments are not common in practice and there are good chances that they may not be available with the user creating the color tables. Hence a good approximation to the equation (6) can be to either consider any reflectance (R_Total) above reflectance value of 1 to be SRF or, assume any reflectance (R_Total) above the reflectance of the substrate to be SRF. We choose the latter as this makes sense because normally substrate has the highest reflectance under normal circumstances and this is why we consider the substrate as whitest point of the image. So SRF can be computed using the following modified equation (7).

```
If (R_Total > Rs)
{
   Normal (R) = Rs;
   SRF = R_Total − Rs;
}
else
{
   Normal (R) = R_Total;
   SRF = 0;
}                          ------ eqn (7)
```

Where, R_Total is the reflectance of the measured sample, Rs is the reflectance of the substrate.

So for computing the overprint, resulting absorption coefficients $f(\alpha\lambda)$ based on Normal(R) of the ink combination are added together (see eqn (3)) and SRF component of the ink combination is computed as per eqn(8). The resulting SRF is weighed by the factor computed as $1/(1+f(\alpha\lambda))$, where $f(\alpha\lambda)$ is the resulting ink absorption coefficients (See eqn (9)).

$$SRF(Combined) = SRF1c1 + SRF2c2 + \ldots + SRFncn \quad \text{eqn 8.}$$

Where,

SRF(Combined) is the combined SRF of the overprint/mixture,

SRF1 c1 is the SRF of ink 1 at concentration C1, and

SRFn cn is the SRF of ink n at concentration Cn.

$$SRF(Final) = SRF(Combined) * 1/(1+f(\alpha\lambda)). \quad \text{eqn (9)}$$

Where $f(\alpha\lambda)$, is the resulting absorption coefficient of the ink combination.

The $f(\alpha\lambda)$ is converted to resulting reflectance values f(Normal(R)) using equation (5).

The final reflectance Final(R) for the predicted color thus can be computed by following equation (10).

$$Final(R) = f(Normal(R)) + SRF(Final). \quad \text{eqn (10).}$$

Final(R) can be converted to resulting color in CIE Lab space using the well known conversions defined in the CIE literature.

The Error correction function can be modelled as 2 stage correction for this Prediction model. One correction that is applied to SRF(Final) and another to the final color value in CIE Lab space. The correction factor for CIE Lab space can be computed in a manner same as in example 1. For correction of the resulting SRF following equation can be used—

$$SRF(Final) = SRF(Final) * SRF\_correction\_factor \quad \text{eqn (11).}$$

Where, SRF correction factor for known ink combinations from the measured data can be computed as follows—

$$SRF\_correction\_factor = SRF(Measured)/SRF(Final). \quad \text{eqn (12).}$$

The SRF correction factor for unknown ink combination can be computed in the manner similar to LAB error factors. So, for computing the color values of unknown ink combinations the SRF value from equation (9) is corrected by using equation (11) before adding in equation (10). The final reflectance values from equation (10) is converted to CIE Lab value before adding the final correction factor in CIE Lab space.

Again, assuming that we are dealing with a 4 color printing ink solid, the input to the above Prediction model will be printed color wedges of 4 color inks at various percentages between 0 to 100% (eg, at a spacing of 10%). The test target could be division K=3 of the ink colorspace, totalling 81 patches. The error function can be a linear interpolation function in 4 dimensional color space interpolating between the values of the known errors from the measured data. From this chart and the prediction model described, highly accurate chart with a division of k=10, can be generated, that can be used as a target for generating color tables. This discussion for CMYK/4 color solid can be extended to color solids using more than 4 colors in a similar manner.

Example 3—Prediction Model Based on Multiplicative Relationship of Inks in the Mixture for Printing on Paper Coated/Uncoated The normalized reflectance values of all the inks are multiplied together after accounting for the substrate as per the equation (13). Let's call this "Multiplicative model".

$$\text{Final}(R) = Rs * R1c1 * R2c2 * \ldots * Rn\ cn \quad \text{eqn (13)}$$

Where,
Final(R) is the reflectance of the overprint,
Rs is the reflectance of the substrate
R1 c1 is the reflectance of ink 1 at concentration C1 divided by reflectance of substrate Rs,
R2 c2 is the reflectance of ink 2 at concentration C2 divided by reflectance of substrate Rs, and
Rn cn is the reflectance of ink n at concentration C2 divided by reflectance of substrate Rs.

Final(R) can be converted to resulting color in CIE Lab space using the well known conversions defined in the CIE literature.

Similar to example 1, we propose the correcting function to add the error correction to the prediction from "Multiplicative model" as below—

$$\text{Actual\_Color\_Predicted} = \text{Multiplicative model}(Ci) + f\_\text{Error}(Ci) \quad \text{eqn (14)}$$

Where,
Ci denotes the concentration of various inks in the combination.
f_Error returns the correction factor in CIE Lab color space.
"Multiplicative model" returns the resulting color based on equation (13) above in CIE Lab space predicted from the "spectral reflectance data" for various inks at their respective concentrations.
The spectral reflectance data for specific ink at respective concentration is computed from that ink primary color data measured at various known concentrations/percentages using an interpolation function.

So, for each of the known ink combination in the target, "Multiplicative model" can be used to compute the theoretical predicted values. Rearranging the equation (14), the difference between the measured value and this predicted value is the error in CIE Lab space for each of these known combinations that form the nodes of the "ErrorSolid".

Assuming that we are dealing with a CMYK printing ink solid, the input to the "Multiplicative model" will be printed color wedges of CMYK inks at various percentages between 0 to 100% (eg, at a spacing of 10%). The test target could be division K=3 of the ink colorspace, totalling 81 patches. The error function can be a linear interpolation function in 4 dimensional CMYK color space interpolating between the values of the known errors from the measured data. From this chart and the prediction model described, highly accurate chart with a division of k=10, can be generated, that can be used as a target for generating color tables. This discussion for CMYK/4 color solid can be extended to color solids using more than 4 colors in a similar manner. Fluorescent ink primaries can be handled using the same method of separating the SRF as in case of Single constant K/S.

Generation of Color Profiles/Color Tables.

The resulting test charts with higher divisions that are generated from small number of measured data as a result of the method disclosed here can be used to create color tables using methods well known in the literature. The difficulty may arise in case of fluorescent colors as they need to be handled differently than normal inks due to their fluorescence. The fluorescent inks loose their fluorescence very fast as the concentration of color is increased or more color is added to the mixture. Also, since the fluorescent inks are not as light fast as the normal inks, they must be used carefully in the color mixture so that, the reduction in the overall light fastness of the printed image is minimum.

We propose that the color gamut boundary without (Gamut A) and with fluorescent inks (Gamut B) is computed. The gamut mapping is to be performed on Gamut B. When computing the color table, the color corresponding to the node in the color table is first determined to lie where? Is it inside Gamut A or outside? Only when a color is outside of the bounds of Gamut A, the fluorescent inks are used in computing the color percentages of the mixture. There are several ways to achieve this. One of the way is to consider the normal ink color solid first in computing the ink concentration for the color. Only when no solution is found the ink color solid with fluorescent inks is used. This way computing Gamut A can be avoided.

The various steps of computing a color table are well defined in literature including the methods to compute the color gamut, color gamut mapping and finding the ink combination for a given color in order to populate the various nodes of the color table. So, we will not describe these here but it is understood for anybody skilled in art to be able to implement the methods efficiently.

The apparatus (FIG. 2) for generating color profiles using the correction and profile generation methods described above consists of a computing device, color measuring device and a printer that is to be profiled. The patches generated by the printer are read using the color measuring device and corresponding color tables are generated by the computing device using the method described in the present invention (FIG. 1).

CITED REFERENCES

[1] Kiran Deshpande and Phil Green—A simplified method of predicting the colorimetry of spot color overprints.
[2] ICC_white_paper_43_Draft2kd.doc—Recommendations for predicting spot colour overprints.
[3] Data-driven Spectral Model for Color Gamut Simulation—Pau Soler, Jen Morovic and Howard Doumaux.

[4] Colour Physics for Industry (Second Edition)—Edited by Roderick McDonald.
ISBN 0 901956 70 8.
[5] Computational color technology by Henry R. Kang. ISBN 0-8194-6119-9.
[6] Fabrice Rousselle, Thomas Bugnon, Roger D. Hersch—Spectral prediction model for variable dot-size printers.

I claim:

1. A method comprising:
    printing, using a multi-color printing device, a color chart comprising a plurality of patches on a substrate, the plurality of patches comprising a plurality of distinct ink combinations;
    predicting, based on a theoretical model for predicting an appearance of overprints of one or more colors on the substrate, predicted color values of the plurality of patches, wherein the theoretical model accounts for an interaction between the substrate and one or more inks of the plurality of distinct ink combinations;
    measuring observed color values of the plurality of patches using a color measuring device;
    generating an error correction function based on a comparison of (i) the predicted color values output based on the theoretical model and (ii) the observed color values of the plurality of patches, wherein the error correction function enables a determination of error correction factors for ink combinations not included in the plurality of patches, and wherein generating the error correction function comprises:
        applying a first correction to a computed spectral radiance factor (SRF) value, and
        applying a second correction to a reflectance value calculated based on the computed SRF value;
    computing an error-corrected color profile based on the theoretical model and the error correction function, the error-corrected color profile comprising one or more target colors not included in the printed color chart; and
    operating the multi-color printing device to print at least one of the one or more target colors not included in the printed color chart, wherein an ink mixture used by the multi-color printing device is determined based on the computed error-corrected color profile.

2. The method of claim 1, wherein printing the color chart comprises printing the color chart using one or more fluorescent inks.

3. The method of claim 1, wherein printing the color chart comprises printing the color chart using one or more non-fluorescent inks.

4. The method of claim 1, wherein predicting the predicted color values of the plurality of patches based on the theoretical model comprises:
    computing the spectral radiance factor (SRF) value as a difference between a reflectance value of a color sample and a reflectance value of the substrate, when the reflectance value of the color sample is greater than the reflectance value of the substrate;
    setting the SRF value to zero when the reflectance value of the color sample is less than or equal to the reflectance value of the substrate; and
    using the SRF value to compute the predicted color values of the plurality of patches based on the theoretical model.

5. The method of claim 1, wherein generating the error correction function comprises interpolating errors for the ink combinations not included in the plurality of patches based on known errors calculated for the plurality of patches.

6. The method of claim 1, wherein computing the error-corrected profile comprises:
    converting the one or more target colors into printing ink percentages comprising only non-fluorescent inks whenever the one or more target colors are achievable using a non-fluorescent ink combination.

7. The method of claim 1, wherein computing the error-corrected profile comprises:
    converting the one or more target colors into printing ink percentages comprising at least one fluorescent ink when the one or more target colors are unachievable using a non-fluorescent ink combination.

8. The method of claim 1, wherein the theoretical model for color prediction is a model selected from a group of models consisting of a single constant Kubelka-Munk model, a two-constant Kubelka-Munk model, a Yule-Neilson model, and a multiplicative model based on a multiplicative relationship of inks.

9. The method of claim 8, wherein the theoretical model comprises separating reflectance values into (i) normal reflectance values and (ii) spectral radiance factor (SRF) values that represent fluorescence.

10. The method of claim 1, wherein the theoretical model for predicting the appearance of overprints of the one or more colors on the substrate is a single theoretical model configured to be used when the substrate is any of a textile, paper, plastic, or any porous or non-porous printable media.

11. The method of claim 1, wherein generating the error correction function comprises determining a weighted sum of a plurality of ink combinations, wherein each of the plurality of ink combinations is associated with a particular location in a color solid.

12. A system comprising:
    a multi-color printing device;
    a color measuring device; and
    one or more computing devices operably connected to the multi-color printing device and the color-measuring device, the one or more computing devices configured to perform operations comprising:
    printing, using the multi-color printing device, a color chart comprising a plurality of patches on a substrate, the plurality of patches comprising a plurality of distinct ink combinations;
    predicting, based on a theoretical model for predicting an appearance of overprints of one or more colors on the substrate, predicted color values of the plurality of patches, wherein the theoretical model accounts for an interaction between the substrate and one or more inks of the plurality of distinct ink combinations;
    measuring observed color values of the plurality of patches using the color measuring device;
    generating an error correction function based on a comparison of (i) the predicted color values output based on the theoretical model and (ii) the observed color values of the plurality of patches, wherein the error correction function enables a determination of error correction factors for ink combinations not included in the plurality of patches, and wherein generating the error correction function comprises:
        applying a first correction to a computed spectral radiance factor (SRF) value, and
        applying a second correction to a reflectance value calculated based on the computed SRF value;
    computing an error-corrected color profile based on the theoretical model and the error correction function, the error-corrected color profile comprising one or more target colors not included in the printed color chart; and operating the multi-color printing device to print at least one of the one or more target colors not included in the printed color chart, wherein an ink mixture used by the multi-color printing device is determined based on the computed error-corrected color profile.

13. The system of claim 12, wherein printing the color chart comprises using one or more fluorescent inks.

14. The system of claim 12, wherein printing the color chart comprises using one or more non-fluorescent inks.

15. The system of claim 12, wherein predicting the predicted color values of the plurality of patches based on the theoretical model comprises:
   computing the spectral radiance factor (SRF) value as a difference between a reflectance value of a color sample and a reflectance value of the substrate, when the reflectance value of the color sample is greater than the reflectance value of the substrate;
   setting the SRF value to zero when the reflectance value of the color sample is less than or equal to the reflectance value of the substrate; and
   using the SRF value to compute the predicted color values of the plurality of patches based on the theoretical model.

16. The system of claim 12, wherein generating the error correction function comprises interpolating errors for the ink combinations not included in the plurality of patches based on known errors calculated for the plurality of patches.

17. The system of claim 12, wherein computing the error-corrected profile comprises:
   converting the one or more target colors into printing ink percentages comprising only non-fluorescent inks whenever the one or more target colors are achievable using a non-fluorescent ink combination.

18. The system of claim 12, wherein computing the error-corrected profile comprises:
   converting the one or more target colors into printing ink percentages comprising at least one fluorescent ink when the one or more target colors are unachievable using a non-fluorescent ink combination.

19. The system of claim 12, wherein the theoretical model for color prediction is a model selected from a group of models consisting of a single constant Kubelka-Munk model, a two-constant Kubelka-Munk model, a Yule-Neilson model, and a multiplicative model based on a multiplicative relationship of inks.

20. The system of claim 19, wherein the theoretical model comprises separating reflectance values into (i) normal reflectance values and (ii) spectral radiance factor (SRF) values that represent fluorescence.

* * * * *